United States Patent [19]

Tomimoto et al.

[11] 4,261,009
[45] Apr. 7, 1981

[54] VIR CONTROL OF HUE AND SATURATION IN RGB DEMODULATOR

[75] Inventors: Tetsuo Tomimoto, Osaka; Yoshitomi Nagaoka, Neyagawa; Reiichi Sasaki, Hirakata, all of Japan

[73] Assignee: Matsushita Electric Industrial Co., Ltd. Wireless Research Laboratory, Osaka, Japan

[21] Appl. No.: 907,033

[22] Filed: May 17, 1978

[30] Foreign Application Priority Data

May 20, 1977 [JP] Japan .................................. 52-59232

[51] Int. Cl.³ ........................ H04N 9/535; H04N 9/52
[52] U.S. Cl. ...................................... 358/27; 358/28; 358/30; 358/23
[58] Field of Search .................... 358/27, 28, 23, 30, 358/50, 65, 64

[56] References Cited

U.S. PATENT DOCUMENTS

| | | | |
|---|---|---|---|
| 2,877,347 | 3/1959 | Clark | 358/30 |
| 2,903,506 | 9/1959 | Livingston | 358/30 |
| 3,535,438 | 10/1970 | Parker | 358/23 |
| 3,558,810 | 1/1971 | Cecchin | 358/23 |
| 3,624,275 | 11/1971 | Lunn | 358/30 |
| 4,023,200 | 5/1977 | Hess | 358/30 |
| 4,101,927 | 7/1978 | Isono et al. | 358/28 |

OTHER PUBLICATIONS

"GE's 'Broadcast-Controlled' Color System; Parts 1 and 2", Electronic Technical/Dealer, Aug. 1976, pp. 14–21; Sep. 1976, pp. 20–29.
"A Review on Colour Television Systems in the World", Saito, NHK Technical Research Laboratories, Tokyo, Oct. 1975, pp. 760–773.
Parker, "An analysis of the necessary decoder corrections for color receiver operation with non–standard receiver primaries", IEEE Transactions on BTR, Apr. 1966, pp. 23–32.
Kiver, Color Television Fundamentals, McGraw-Hill, Second Edition, 1964, pp. 27 and 30.

Primary Examiner—John C. Martin
Attorney, Agent, or Firm—Wenderoth, Lind & Ponack

[57] ABSTRACT

A chrominance signal controlling apparatus for controlling the chrominance signal in a color television receiver employing a primary color signal demodulator providing red, green and blue primary color signals and not providing color difference signals comprises a luminance signal producing circuit for producing a luminance signal by mixing the three primary color signals, a subtracting circuit for producing a difference signal between one of the primary color signals and the luminance signal, and a comparing circuit for producing a control signal for controlling the chrominance signal level and/or phase by keeping the difference signal equal to a reference level.

2 Claims, 3 Drawing Figures

VIR CONTROL OF HUE AND SATURATION IN RGB DEMODULATOR

This invention relates to a color television receiver in which color-difference signals cannot easily be obtained, and more particularly to a chrominance signal controlling apparatus for controlling the chrominance signal in a color television receiver.

In accordance with a ruling by FCC (the Federal Communication Commision) of U.S.A. in October of 1975, during TV broadcasting a VIR (Vertical Interval Reference) signal may be transmitted on scanning line 19 of each of the two interlaced fields. The chrominance signal is corrected automatically by a VIR control circuit in the TV receiver with reference to the VIR signal transmitted by the TV station. This is described in detail, for example, in the articles entitled "GE's Broadcast-Controlled Color System Part 1 and Part 2" in the U.S. magazine "Electronic Technician/-Dealer", August and September, 1976. The VIR control circuit is supplied with color-difference signals and produces a control signal for controlling the chrominance signal level and phase, so that the color-difference signal level corresponding to the VIR signal stays at a predetermined level.

Recently, integrated circuits have been employed in TV receivers for processing the video and chrominance signals. Some TV receivers are equipped with a video-chrominance signal processing IC (integrated circuit) as shown, for instance, in the circuit diagram of a receiver TH20-B1 manufactured by Matsushita Electric Ind. Co., Ltd., Japan. The composite video signal and the composite color signal are applied to the inputs of this IC, and it produces the three primary color signals at the outputs thereof. However, because this IC generates no color-difference signals (R-Y, G-Y and B-Y signals) and no amplitude-variable luminance signal, the VIR control system as described above or other chrominance signal controlling apparatus which detects the color-difference signal level and keeps it constant cannot be used in a receiver having such an IC.

Therefore, it is an object of this invention to provide a novel and improved chrominance signal controlling apparatus which can be applied to a receiver which provides the three primary color signals at the output terminals thereof but which does not provide a color-difference signal at any of its output terminals.

Another object of this invention is to provide a novel and improved chrominance signal controlling apparatus by which the automatically controlled chrominance level and phase can also be varied manually according to the desires of a viewer.

These objects are achieved by providing a chrominance signal controlling apparatus according to this invention, which comprises a luminance signal producing means for producing a luminance signal by mixing the three primary color signals which are supplied thereto, a subtracting means coupled to the luminance signal producing means for producing a difference signal between one of the primary color signals and the luminance signal, and the comparing means for comparing a level of the difference signal level with a reference level so as to produce a control signal for controlling the chrominance signal level and/or the phase of the carrier wave by keeping the difference signal equal to this level.

These and other objects and the features of this invention will be apparent from the following description taken in connection with the accompanying drawings, in which.

Initially, prior to the detailed description of the present invention, a conventional chrominance signal controlling apparatus will be described in order to clarify the features of the present invention, referring to FIGS. 1 and 2.

At present, the VIR signal is transmitted from several TV stations in the U.S.A. on the scanning line 19 of each of the two interlaced fields. FIG. 2 shows the waveform of the VIR signal in accordance with the October 1975 ruling by the FCC. The portion of the VIR signal marked A is a chrominance reference which has the same amplitude and phase as those of the burst signal marked B at the point of TV program origination. However, when the signal is transmitted through broadcast equipment and transmission lines, it is distorted, and so amplitude and phase differences are caused between the chrominance reference and the burst signal. For this distortion, the chrominance reference in the VIR signal is more reliable than the burst signal, because the former is at a 70% luminance level which is about the same luminance level as skin color and so the VIR signal suffers the same distortion as the skin color.

Figure 1:
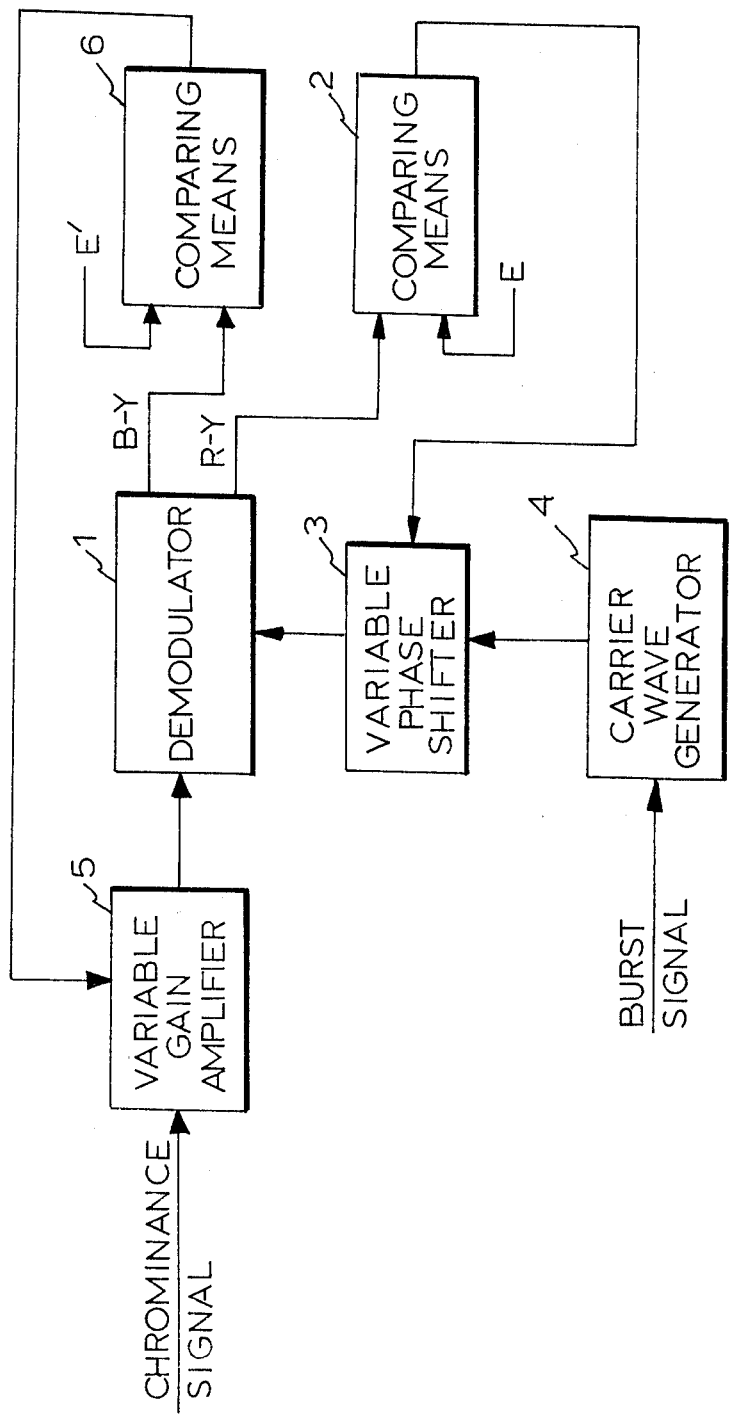
FIG. 1 is a schematic block diagram of a conventional chrominance signal controlling apparatus which is presented to explain the invention.
Figure 2:
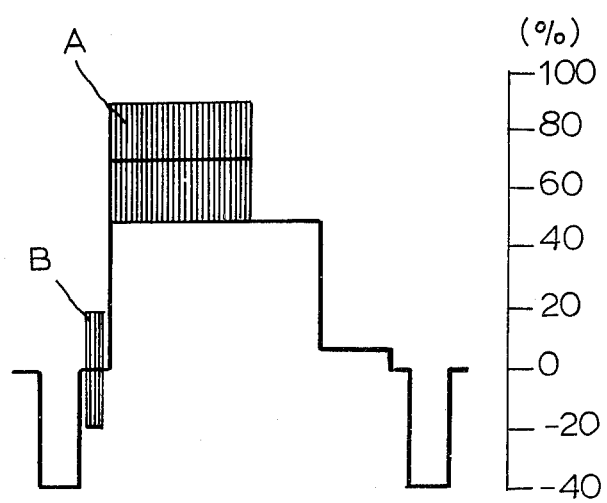
FIG. 2 is a graph of the Vertical Interval Reference Signal.

FIG. 1 is a block diagram of a conventional VIR control circuit as an example of a conventional chrominance signal controlling apparatus. The chrominance signal is amplified by a variable gain amplifier designated by a reference numeral 5 and demodulated by demodulator 1 to a R-Y signal and a B-Y signal. The R-Y signal is applied to comparing means 2 and is compared with a reference level E during the first half period of the VIR signal. The difference voltage between the level E and the R-Y level of the VIR signal is held in the comparing means 2 until the next VIR signal comes, whereupon it is supplied to a variable phase shifter 3 for controlling the phase of the carrier wave supplied from carrier wave generator 4. The phase shifted carrier wave is supplied to the demodulator 1, where the chrominance signal is demodulated with reference to the phase shifted carrier wave.

If the R-Y level of the VIR signal differs from the level E, the comparing means 2 provides a phase control signal to the variable phase shifter 3 so as to shift the phase of the carrier wave until the R-Y level of the VIR signal becomes equal to the level E.

In the same manner, the B-Y signal obtained at the output of the demodulator 1 is supplied to the comparing means 6 and it is compared thereat with a reference level E'. If the B-Y level of the VIR signal differs from the level E', the comparing means 6 provides a gain control signal to the variable gain amplifier 5 to control and controls the amplitude of the chrominance signal so that the B-Y level of the VIR signal becomes equal to the level E'.

As set forth above, the conventional VIR control circuit keeps the R-Y and the B-Y signal levels of the VIR signal constant, and so the color stability of the displayed picture is improved. However, this conventional VIR control circuit cannot be applied to a TV receiver in which the color-difference signals are not provided at any terminals of the circuit, as described before. For example, because a TV receiver TH20-B1 made by Matsushita Electric Ind. Co., Ltd. in Japan is equipped with a video-chrominance processing IC, AN5310 (made by Matsushita Electronics Co., in Japan), which provides the three primary colors at its output terminals but does not provide color-difference signal outputs, such a VIR control circuit cannot be applied to this TV receiver.

According to this invention, a chrominance signal controlling apparatus is provided which can perform the same control operation as described above by means of adding a simple luminance signal producing means and a subtracting means.

Figure 3:
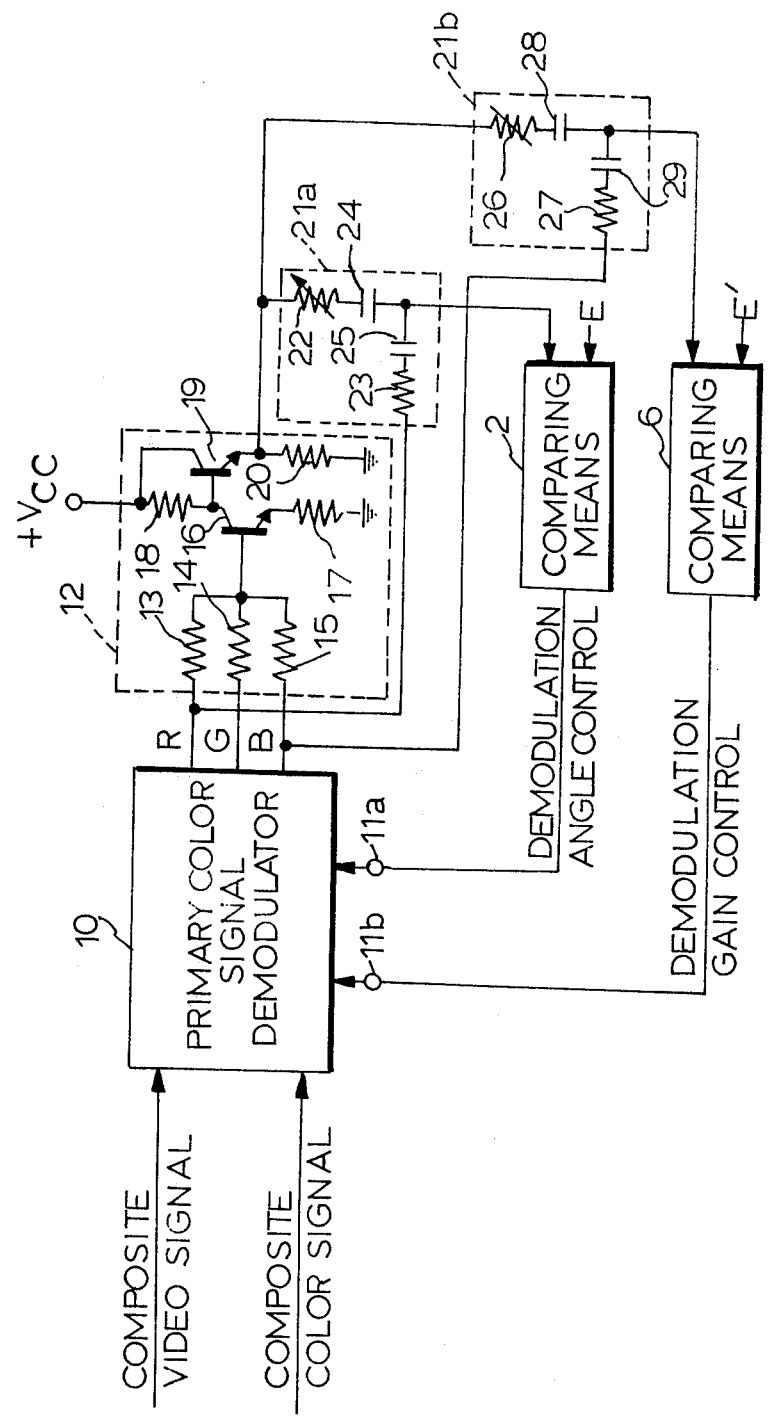
FIG. 3 is a schematic block diagram, partially in block form, of an embodiment of a chrominance signal controlling apparatus according to this invention.

FIG. 3 is a schematic block diagram of an embodiment of a chrominance signal controlling apparatus according to this invention. A primary color signal demodulator 10 is responsive to the composite color signal and the composite video signal for demodulating the three primary color signals R, G and B. A control signal for controlling the demodulation angles of the color-difference signal demodulators is supplied to terminal 11a of the primary color signal demodulator 10, and a control signal for controlling the gains of the color-difference signal demodulators is supplied to terminal 11b.

The three primary color signals R, G and B are supplied to a luminance signal producing means 12, which adds these three primary colors so as to remove the color-difference signals and to produce only a luminance signal. Three resistors 13, 14 and 15 are provided for adding these three primary color signals. The ratio of the resistances $r_1$, $r_2$ and $r_3$ of the respective resistors 13, 14 and 15 are defined as satisfying the following equation;

$$r_1 : r_2 : r_3 = A_R \sin(\theta_R - \theta_G)\sin(\theta_R - \theta_B)$$
$$: A_G \sin(\theta_G - \theta_B)\sin(\theta_G - \theta_R)$$
$$: A_B \sin(\theta_B - \theta_R)\sin(\theta_B - \theta_G)$$

where $A_R$, $A_G$ and $A_B$ are the relative demodulation gains, and $\theta_R$, $\theta_G$ and $\theta_B$ are the demodulation angles. That is, when the ratio the resistances $r_1$, $r_2$ and $r_3$ satisfy the above equation, the color-difference signals are eliminated and only the luminance signal is provided to the base of transistor 16.

This luminance signal is inverted by an amplifier consisting of the two resistors 17 and 18 and a transistor 16. Then, this inverted luminance signal is supplied, through an emitter follower consisting of a transistor 19 and a resistor 20, to the subtracting means 21a and 21b. The subtracting means 21a consists of a variable resistor 22, a resistor 23 and two capacitors 24 and 25. The inverted luminance signal is added to the primary signal R by the subtracting means 21a to obtain the color-difference signal R-Y.

This R-Y signal is supplied to a comparing means 2 and compared with a reference level E. When the amplitude of the R-Y signal is different from the level E, the comparing means 2 provides a phase control signal to the terminal 11a of the primary color signal demodulator 10 so as to control the phase of the carrier wave, so that the R-Y signal level becomes equal to the level E. In this case, the comparing means 2 should contain a pedestal clamping circuit, because the subtracting means 2 cuts off the DC components of the inverted luminance signal and the R primary signal.

The subtracting means 21b consists of a variable resistor 26, a resistor 27 and two capacitors 28 and 29. The inverted luminance signal is added to the primary signal B by this subtracting means 21b to obtain the color-difference signal B-Y. This B-Y is supplied to a comparing means 6. When the amplitude of the B-Y signal is different from a reference level E', the comparing means 6 provides a gain control signal to the terminal 11b of the primary color signal demodulator 10 so as to control the amplitude of the chrominance signal, so that the B-Y signal level becomes equal to the level E'. The variable resistors 22 and 26 are provided as amplitude control means for controlling the mixing ratio of the inverted luminance signal and the respective primary color signal. The automatically controlled chrominance level and phase can be varied manually by means of these variable resistors 22 and 26.

As described hereinbefore in detail, according to the present invention, there is provided a chrominance controlling apparatus which can be applied to a TV receiver having no terminals providing the color-difference signal but only providing the primary color signals. Although the foregoing description is mainly concerned with the VIR control system, it is apparent that the apparatus can be adopted to other chrominance control systems which keep the color-difference signal level constant.

What is claimed is;

1. A chrominance signal controlling apparatus for controlling the chrominance signal in a color television receiver employing a primary color signal demodulator providing only red, green and blue primary color signals at the output terminals thereof, said apparatus comprising:
   a luminance signal producing means for forming a luminance signal by mixing said red, green and blue primary color signals in substantially the ratio
   $$A_R\sin(\theta_R-\theta_G)\sin(\theta_R-\theta_B) : A_G\sin(\theta_G-\theta_B)\sin(\theta_G-\theta_R) : A_B\sin(\theta_B-\theta_R)\sin(\theta_B-\theta_G)$$
   respectively, where $A_R$, $A_G$ and $A_B$ are the respective red, green and blue relative demodulation gains of the primary color signal demodulator and $\theta_R$, $\theta_G$ and $\theta_B$ are the respective red, green and blue demodulation angles of the primary color signal demodulator;
   a subtracting means connected to said luminance signal producing means for producing a difference signal between one of the primary color signals and said luminance signal; and
   a comparing means connected to said subtracting means for comparing the level of said difference signal with a predetermined reference level for producing a control signal for controlling the chrominance signal level and/or the phase of a carrier wave by keeping the level of said difference signal equal to said reference level.

2. A chrominance signal controlling apparatus as claimed in claim 1, wherein said subtracting means includes an amplitude control means for controlling the amplitude of said luminance signal and for controlling the residual luminance signal in said difference signal.

* * * * *